E. ANDREWS.
Mode of Hanging Reciprocating Saws in Saw Mills.
No. 76,969.  Patented April 21, 1868.
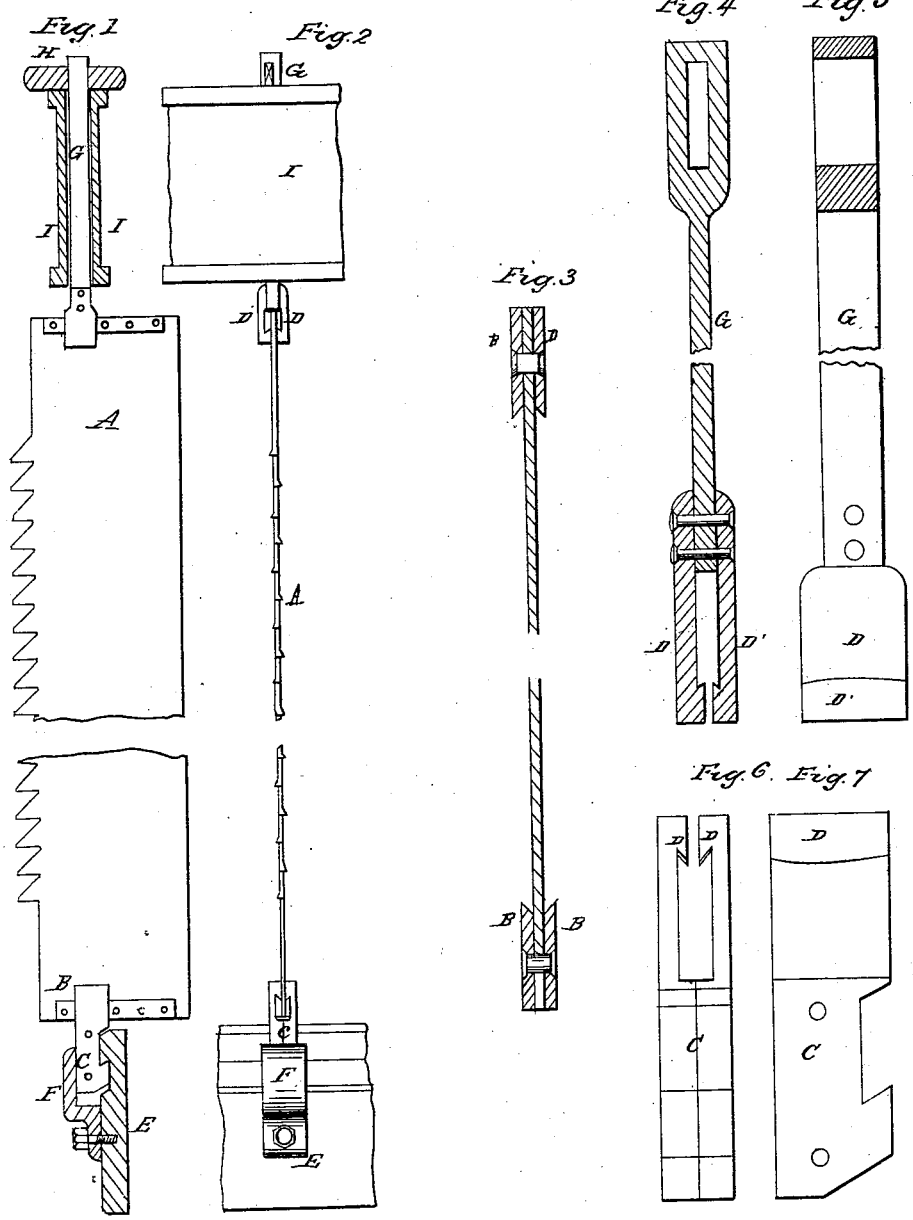

United States Patent Office.

EMANUEL ANDREWS, OF WILLIAMSPORT, PENNSYLVANIA.

Letters Patent No. 76,969, dated April 21, 1868.

IMPROVEMENT IN MODE OF HANGING RECIPROCATING SAWS IN SAW-MILLS.

The Schedule referred to in these Letters Patent and making part of the same.

TO ALL WHOM IT MAY CONCERN:

Be it known that I, EMANUEL ANDREWS, of Williamsport, county of Lycoming, and State of Pennsylvania, have invented a new and improved Mode of Hanging Reciprocating Saws; and I do hereby declare that the following is a full and exact description thereof, reference being had to the accompanying drawings, and to the letters of reference marked thereon.

Figure 1 is a side view of a saw with my invention applied to it.

Figure 2 is a front sectional view of the same.

Figure 3 is an edge view of a saw, with its ends fixed for my hook and stirrup.

Figure 4 is a front view of top stirrup.

Figure 5 is a side sectional view of the same.

Figure 6 is a front view of bottom hook.

Figure 7 is a side sectional view of the same.

In using reciprocating saws, it is very important to have them properly strained. A saw should be strained more at the front or cutting-edge than at the back. The usual mode of hanging saws is to drill a hole nearer to the cutting-edge than the back; and as the saw wears away, new holes are drilled farther back, and the saw is hung in the gate by means of tug-pins and stirrups. When the second hole is drilled in the saw, a sufficient space is left between the holes to give strength; otherwise, by repeated drilling, the end of the saw would soon break off. It is therefore obvious that saws hung by means of holes and tug-pins cannot be strained at all times as they should be, for the space that is left between the holes will not permit it. Buckles having straight lips have been tried with saws having strips at the ends, and these have failed to accomplish the desired results, owing to the difficulty of getting and keeping saws free from being longest at edges. A saw in this condition is usually called buckled, and when this is the case, a straight-lipped buckle-stirrup or hook will strain on the shortest part of the saw, which is the middle, leaving the cutting-edge unstrained.

The nature of my invention is to remove the difficulty heretofore experienced in getting the proper strain in hanging reciprocating saws, and furnish a ready way of adjusting the rake, and enabling sawyers to use a thinner saw than has been used in manufacturing and sawing lumber. In practice, it is proved that when a saw is properly strained, a very thin saw may be used, while it is difficult to make a thick saw work when improperly strained.

To enable others skilled in the art to fully understand and construct my invention, I will proceed to describe it.

A represents a mill-saw, B B strips of steel riveted to each side of saw A, and at both ends the edges are bevelled, as shown in fig. 3. C is the lower hook, with lips D D, (see fig. 6.) These lips are made circling, as shown in fig. 7. E is the lower girder of saw-gate, the upper edge of which is made with a lip, fitted to correspond with lipped hook C. F is a support attached to girder E, to hold hook C in an upright position when the saw is removed from the gate. G is the upper stirrup, having at its lower end lips D' D', and at its upper end a slot, as shown in fig. 4. Lips D' D' are made circling, (see fig. 5.) H is a key, fitted in the slot of stirrup G. I I is the upper girder of saw-gate, which is made in two parts, arranged so that a space is left between them equal to the width of stirrup G.

When hanging a saw, stirrup G and hook C are placed in position, and a saw, fitted as shown in fig. 3, is placed between the lips D D of hook C and lips D' D' of stirrup G. Key H, on being driven home, causes the lips of hook C and stirrup G to engage the strips B B B B on saw A, and the saw will be strained in a line with the point of contact.

From the above description, it will be seen that, by making the lips D D on hook C, and lips D' D' on stirrup G, circling, a saw may be moved in either direction, and advanced more or less at the top, to give rake to the saw without straining on the corners of lips, which would be the result if the lips were made straight. It is also found, in practice, that the circular form of lips allows saws to be strained more, with less strain on the girders of the saw-gate than if they were made straight; and by the facility afforded to strain saws at the proper place, a much thinner saw can be used, and consequently a great saving in lumber and power to drive the saw is gained—two very important items in a saw-mill.

I do not claim hanging reciprocating saws by stirrup and buckles, with lips, in connection with strips riveted on the end of saws, for these have been previously used.

What I claim, and desire to secure by Letters Patent, is—

Hanging reciprocating saws, so that the strain may be adjusted to any desired part, by hooks and stirrups, with circular lips, when made and arranged substantially as and for the purpose set forth.

EMANUEL ANDREWS.

Witnesses:
    WILLIAM M. BARR,
    JOSEPH ANDREWS.